United States Patent [19]

Yoshida

[11] Patent Number: 5,749,624
[45] Date of Patent: May 12, 1998

[54] SEAT RECLINING DEVICE

[75] Inventor: Tomonori Yoshida, Yokohama, Japan

[73] Assignee: Ikeda Bussan Co., Ltd., Ayase, Japan

[21] Appl. No.: 744,479

[22] Filed: Nov. 6, 1996

[30] Foreign Application Priority Data

Nov. 8, 1995 [JP] Japan ................................ 7-314701

[51] Int. Cl.⁶ .................................................. B60N 2/02
[52] U.S. Cl. ............... 297/367; 297/216.13; 297/463.1; 297/361.1
[58] Field of Search ........................ 297/354.12, 361.1, 297/367, 463.1, 216.13, 216.14, 463.2, 216.1

[56] References Cited

U.S. PATENT DOCUMENTS

| | | | |
|---|---|---|---|
| 4,789,204 | 12/1988 | Kanazawa | 297/354.12 |
| 4,874,205 | 10/1989 | Arefinejad et al. | 297/367 |
| 5,507,553 | 4/1996 | Nishizawa et al. | 297/216.13 |
| 5,509,716 | 4/1996 | Kolena et al. | 297/216.1 |
| 5,586,833 | 12/1996 | Vossmann et al. | 297/361.1 |

FOREIGN PATENT DOCUMENTS

| | | | |
|---|---|---|---|
| 2404598 | 8/1975 | Germany | 297/367 |
| 4333147 | 3/1994 | Germany | 297/367 |
| 2078850 | 1/1982 | United Kingdom | 297/367 |

*Primary Examiner*—Peter M. Cuomo
*Assistant Examiner*—Anthony D. Barfield
*Attorney, Agent, or Firm*—Foley & Lardner

[57] ABSTRACT

A reclining device for a seat comprises first and second side reclining mechanisms which are substantially the same in construction and mounted to respective sides of the seat to allow a seat back to be locked at a desired angular position relative to a seat cushion. A connecting rod extends between the first and second side reclining mechanisms. The connecting rod induces a locked condition of the seat back when turned in a first direction about an axis thereof and induces an unlocked condition of the seat back when turned in a second direction about the axis. A control lever is connected to one end of the connecting rod to pivot therewith. A projection is formed on the connecting rod in a manner to project in a direction perpendicular to the axis of the connecting rod.

13 Claims, 8 Drawing Sheets

SEAT RECLINING DEVICE

BACKGROUND OF THE INVENTION

1. Field of the Invention

The present invention relates in general to reclining devices of an automotive seat and more particularly to the seat reclining devices of a tough type which can keep a locked condition thereof even when an abnormal big force is applied thereto due to a vehicle collision or the like. More specifically, the present invention is concerned with the reclining devices of a type having two substantially identical side reclining mechanisms which are mounted to respective sides of the seat and operatively connected to each other by a connecting rod for obtaining simultaneous operation of the two reclining mechanisms.

2. Description of the Prior Art

In order to clarify the task of the present invention, one conventional seat reclining device of the above-mentioned type will be described with reference to FIGS. 12 and 13 of the accompanying drawings.

In FIG. 12, there is shown an automotive seat to which the conventional seat reclining device is operatively applied. The device comprises two substantially identical side reclining mechanisms 6 and 6' which are respectively mounted to outer and inner sides of the seat. Each reclining mechanism 6 or 6' comprises generally a base plate 8 secured to a seat cushion 7, an arm plate 10 secured to a seat back 9, and a lock mechanism operatively interposed between the base plate 8 and the arm plate 10. The respective lock mechanisms of the two side reclining mechanisms 6 and 6' are connected through a connecting rod (not shown) to achieve simultaneous operation of the reclining mechanisms 6 and 6'. The reclining mechanisms 6 mounted to the outer side of the seat is provided with a control lever 11.

When the seat back 9 assumes an angular operative position as shown in FIG. 12, both the lock mechanisms of the reclining mechanisms 6 and 6' are in their locked condition locking the seat back 9 relative to the seat cushion 7. When now the control lever 11 is pivoted upward as shown in FIG. 13, locked condition of the outer side lock mechanism and that of the inner side lock mechanism are canceled simultaneously due to the synchronous operation transmission by the connecting rod. Under this unlocked condition, the seat back 9 is permitted to pivot freely relative to the seat cushion 7. When the control lever is released from an operator's hand and thus returned to its original position, the lock mechanisms of both the reclining mechanisms operate to lock the seat back 9 at a new angular position relative to the seat cushion 7.

However, some of the conventional seat reclining devices of the above-mentioned type fail to have a satisfied durability against an abnormal big force applied thereto due to a vehicle collision or the like. That is, upon a vehicle collision, it tends to occur that the locked condition of the lock mechanisms becomes canceled causing a seat occupant to be moved together with the unlocked seat back 9.

SUMMARY OF THE INVENTION

It is therefore an object of the present invention to provide a seat reclining device which can exhibit a strong durability against a big force applied thereto.

According to a first aspect of the present invention, there is provided a reclining device for use in a seat including a seat cushion and a seat back. The reclining device comprises first and second side reclining mechanisms which are substantially the same in construction and mounted to respective sides of the seat to allow the seat back to be locked at a desired angular position relative to the seat cushion; a connecting rod extending between the first and second side reclining mechanisms, the connecting rod inducing a locked condition of the seat back when turned in a first direction about an axis thereof and inducing an unlocked condition of the seat back when turned in a second direction about the axis; a control lever connected to one end of the connecting rod to pivot therewith; and a projection formed on the connecting rod, the projection having a part which extends perpendicular to the axis of the connecting rod.

According to a second aspect of the present invention, there is provided an automotive reclining seat which comprises a seat cushion; a seat back having a flexible pad packed therein; first and second side reclining mechanisms which are substantially the same in construction and mounted to respective sides of the seat cushion and seat back for allowing the seat back to be locked at a desired angular position relative to the seat cushion; a connecting rod extending between the first and second side reclining mechanisms, the connecting rod inducing a locked condition of the seat back when turned in a first direction about an axis thereof and inducing an unlocked condition of the seat back when turned in a second direction about the axis; a control lever connected to the connecting rod to pivot therewith; means defining in the flexible pad of the seat back a narrow tunnel through which the connecting rod extends; and a projection formed on the connecting rod, the projection being brought into abutment with a wall of the narrow tunnel to suppress the turning of the connecting rod in the second direction when the narrow tunnel is largely deformed.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
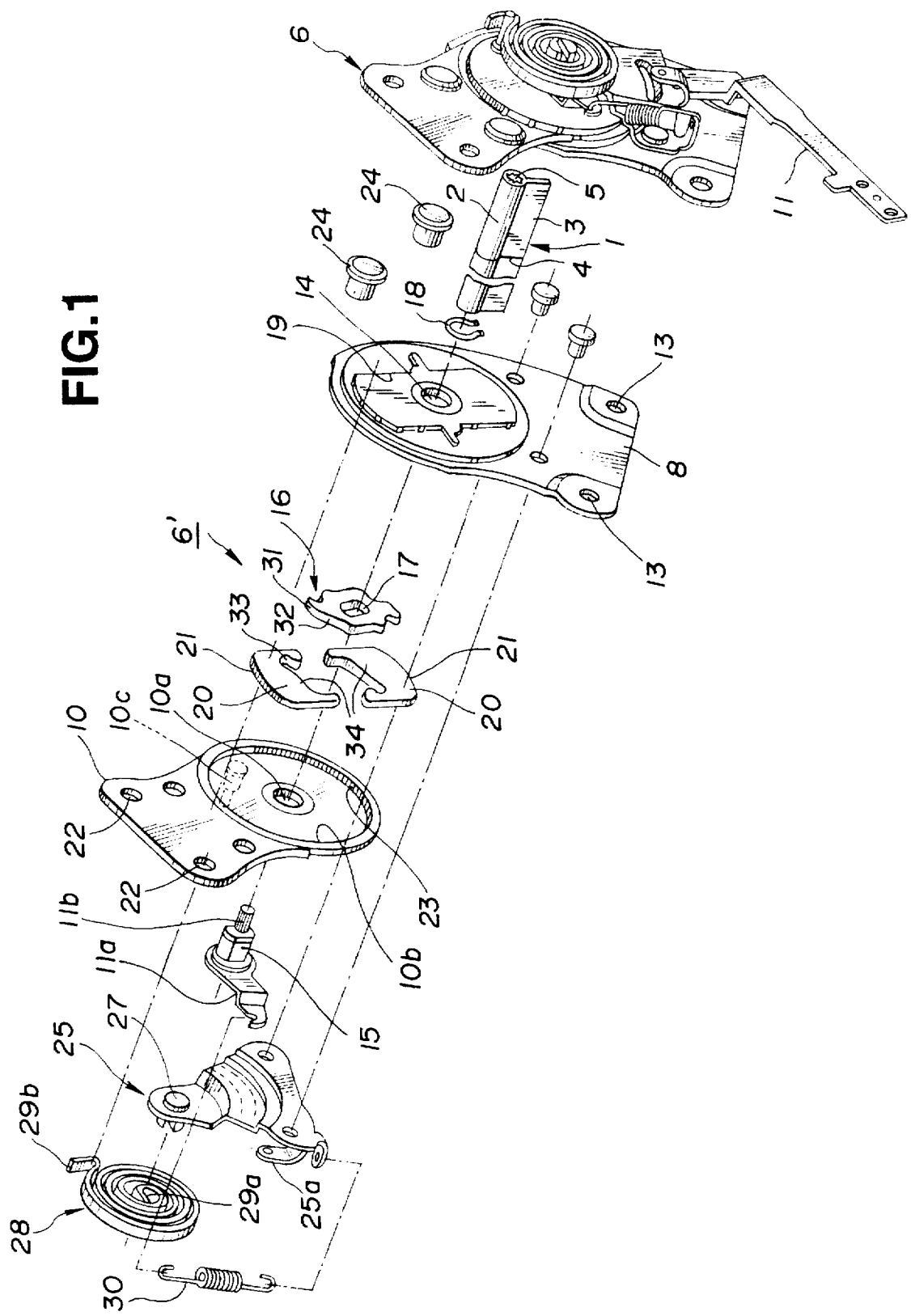
FIG. 1 is a partially exploded perspective view of a seat reclining device according to the present invention.
Figure 2:
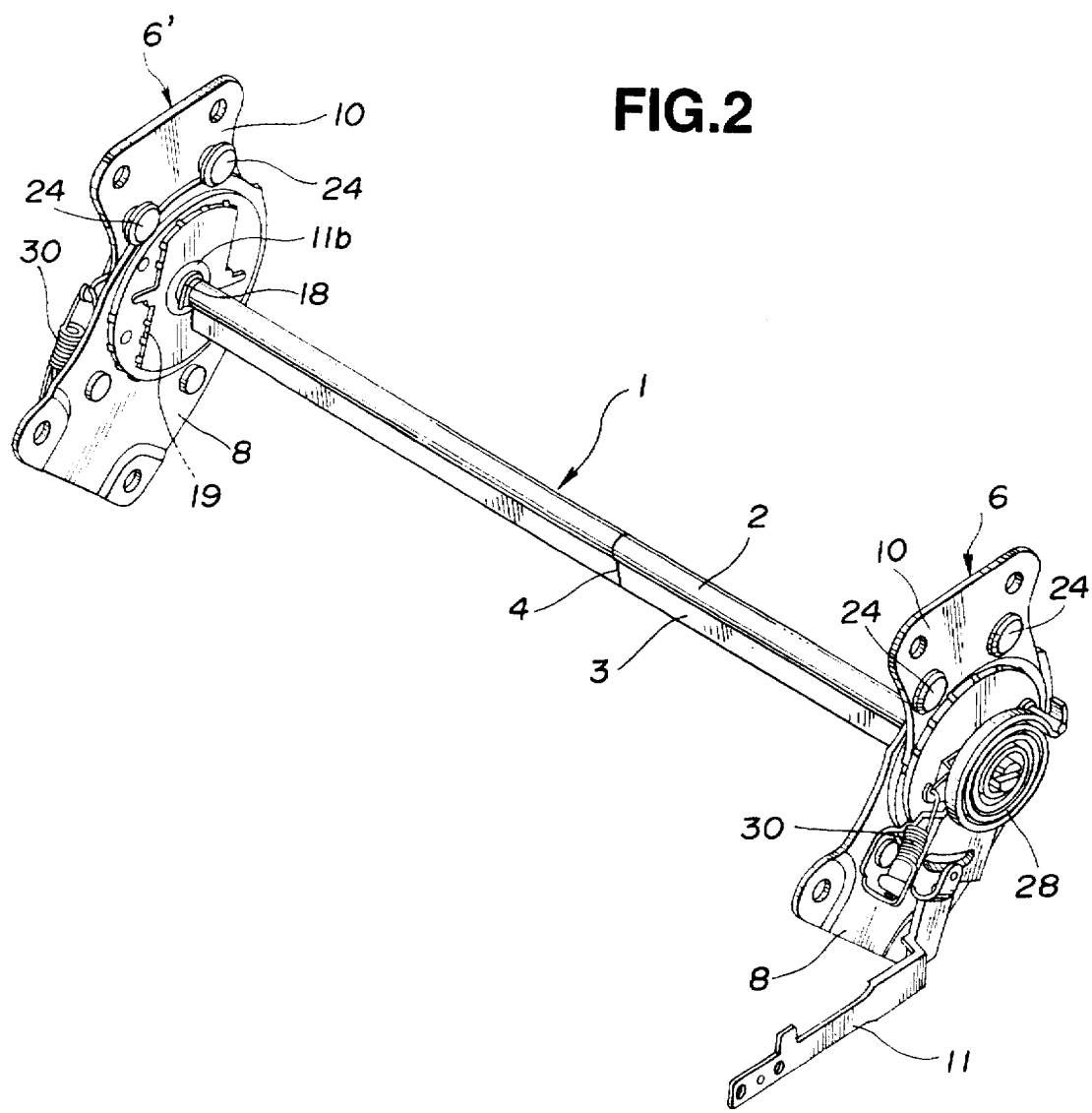
FIG. 2 s a perspective view of the seat reclining device of the present invention in assembled condition.
Figure 3:
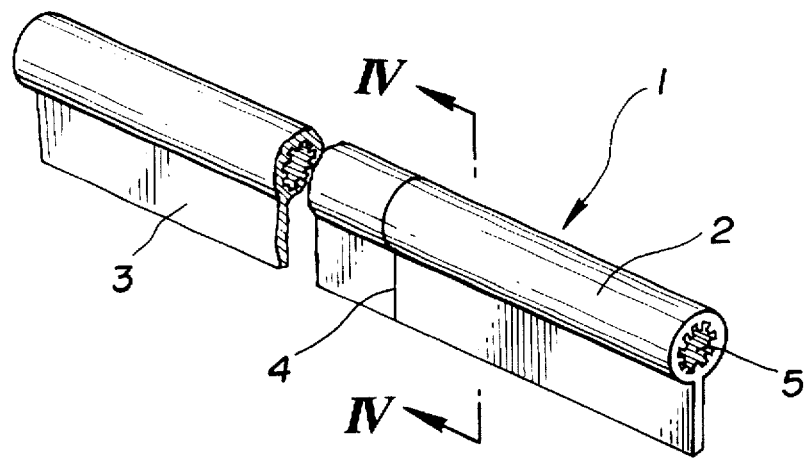
FIG. 3 is a partially cut perspective view of a connecting rod employed in the seat reclining device of the present invention.
Figure 4:
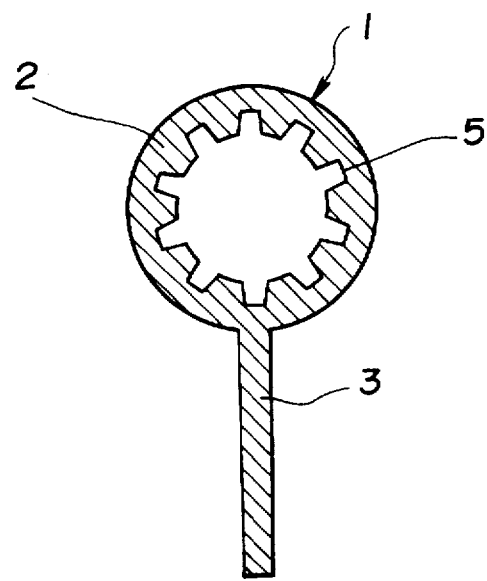
FIG. 4 is an enlarged sectional view taken along the line IV—IV of FIG. 3.

Referring to FIGS. 1 to 11, particularly FIGS. 1 and 2, there is shown a seat reclining device according to the present invention.

As is seen from FIG. 2, the seat reclining device of the present invention comprises generally an outer side reclining mechanism 6 mounted to an outer side of an automotive seat (not shown), an inner side reclining mechanism 6' mounted to an inner side of the seat, a connecting rod 1 connecting the two reclining mechanisms 6 and 6' and a control lever 11 associated with the outer side reclining mechanism 6.

Since the two side reclining mechanisms 6 and 6' are substantially the same in construction except for the orientation of parts, detailed description will be directed to only the inner side reclining mechanism 6'.

In the following description, words, such as right, left, forward, rearward and the like are to be understood with respect to an occupant seated on an associated automotive seat.

As is seen from FIG. 1, the side reclining mechanism 6' comprises a base plate 8 which is secured to a right rear portion of a seat cushion (not shown) of the seat. For this securing, the base plate 8 is formed with bolt openings 13 through which connecting bolts (not shown) pass for connection with a frame structure of the seat cushion. The base plate 8 is formed with a circular center opening 14 through which a rotation shaft 15 passing through a center opening 10a of an arm plate 10 is rotatably supported. Thus, the arm plate 10 is pivotal relative to the base plate 8. The rotation shaft 15 has both a lever 11a secured thereto and a coaxial shaft 11b secured thereto. For the reason which will become apparent hereinafter, the coaxial shaft 11b is a splined shaft. A snap ring 18 is fitted to an exposed part of the rotation shaft 15 to hold the shaft 15 in position.

The arm plate 10 is secured to a right lower portion of a seat back (not shown) of the seat. For this securing, the arm plate 10 is formed with bolt openings 22 through which connecting bolts (not shown) pass for connection with a frame structure of the seat back. Designated by numeral 24 are headed guide pins which are secured to the arm plate 10 for guiding the rotation movement of the arm plate 10 relative to the base plate 8. The seat back, thus, can pivot relative to the seat cushion.

The base plate 8 is formed with a rectangular recess 19 which faces the arm plate 10 and acts as a guide groove. The arm plate 10 is formed with a circular recess 10b which faces the base plate 8. The circular recess 10b is formed around a periphery thereof with an internal gear 23.

Between the base plate 8 and the arm plate 10 which are put on each other, there are interposed a cam member 16 and a pair of inner pieces 20 in the following manner.

The paired inner pieces 20 are slidably received in the rectangular recess 19 leaving a certain center space therebetween. Each inner piece 20 is formed at an outer rounded end thereof with external teeth 21. Within the center space defined by the paired inner pieces 20, there is rotatably received the cam member 16. The cam member 16 is formed with a rectangular center opening 17 through which a rectangular part of the rotation shaft 15 snugly passes. Thus, the cam member 16 rotates together with the rotation shaft 15.

As will become apparent as the description proceeds, when the cam member 16 is pivoted in one direction by the rotation shaft 15, the paired inner pieces 20 are forced to move radially outward to induce a meshed engagement between the external teeth 21 thereof and the internal gear 23 of the arm plate 10. While, when the cam member 16 is pivoted in the other direction, the paired inner pieces 20 are forced to move radially inward canceling the meshed engagement. For establishing such meshed engagement, the thickness of each inner piece 20 is greater than the depth of the rectangular recess 19 of the base plate 8, and the longitudinal length of the rectangular recess 19 of the base plate 8 is somewhat greater than the diameter of the circular recess 10b of the arm plate 10.

A holder member 25 is secured to the base plate 8 by means of rivets 26. The holder member 25 has both an arm 25a secured thereto and a center pin 27 connected thereto. The center pin 27 is aligned with the rotation shaft 15.

A coil type return spring 28 has an inner end 29a hooked to the center pin 27 and an outer end 29b hooked to a stud 10c secured to the arm plate 10. Thus, due to work of the return spring 28, the arm plate 10 is biased to pivot forward about the axis of the center pin 27 relative to the base plate 8, that is, the seat back is biased to pivot forward relative to the seat cushion.

A worm type spring 30 has one end hooked to the arm 25a of the holder member 25 and the other end hooked to the lever 11a of the rotation shaft 15. Thus, due to work of the spring 30, the rotation shaft 15 is biased to pivot in a counterclockwise direction in FIG. 1, that is, in such a direction as to induce the meshed engagement of the paired inner pieces 20 with the internal gear 23 of the arm plate 10.

Figure 5:
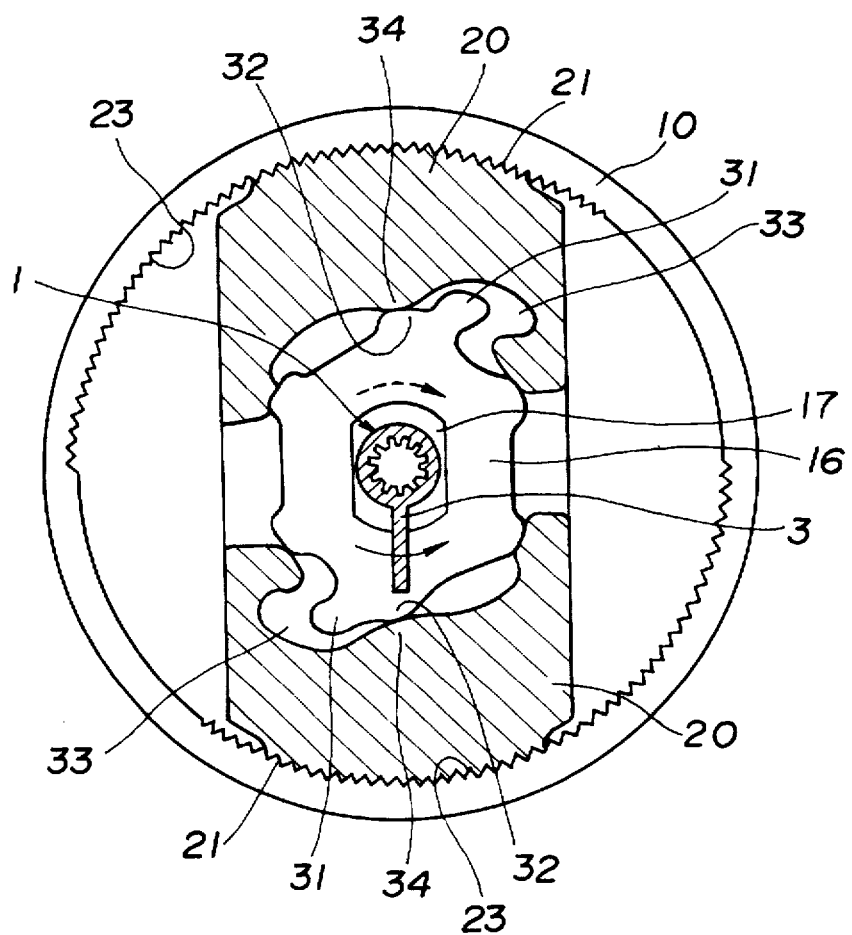
FIG. 5 is an enlarged sectional view of a lock mechanism employed in the seat reclining device of the invention, showing a condition wherein the lock mechanism assumes LOCK-ON condition.

In FIG. 5, there is shown a detailed arrangement of the cam member 16, the paired inner pieces 20 and the inner gear 23. As shown, the cam member 16 has at diametrically opposed parts thereof respective cam portions each including a largely projected first cam 31 and a slightly projected second cam 32. Each inner piece 20 is formed at a radially inward end thereof with both a rounded recess 33 and a rounded projection 34.

Figure 8:
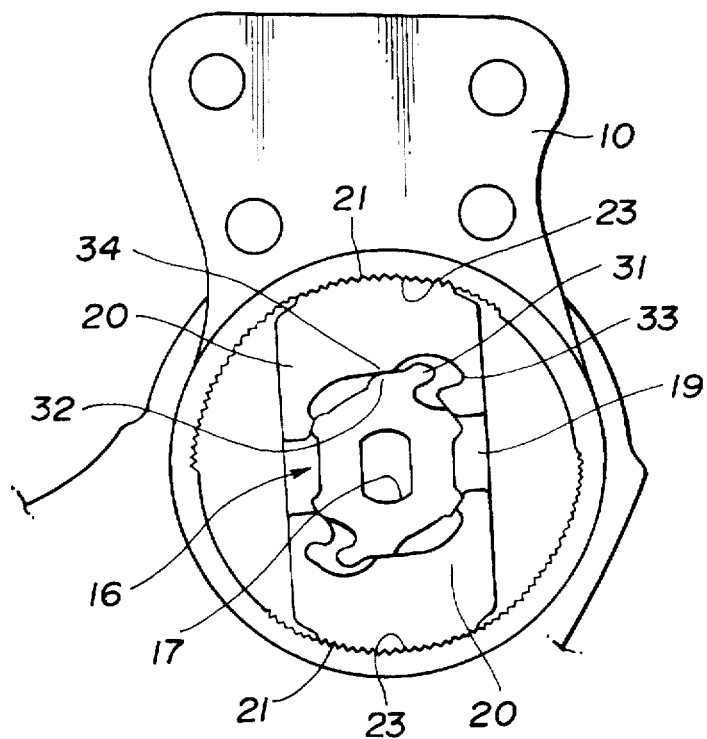
FIG. 8 is a sectional view of the lock mechanism in LOCK-ON condition.

As will be seen from FIG. 8, when the cam member 16 assumes a first position wherein the second cams 32 thereof are in abutment with the rounded projections 34 of the paired inner pieces 20, the inner pieces 20 are in meshed engagement with the inner gear 23 of the arm plate 10. Under this condition, the arm plate 10 is locked relative to the base plate 8, that is, the seat back is locked relative to the seat cushion.

Figure 9:
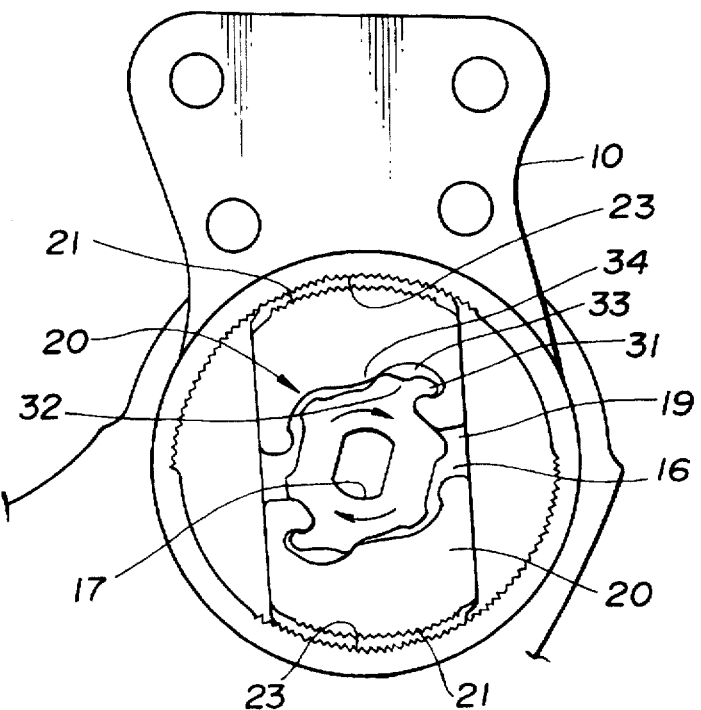
FIG. 9 is a view similar to FIG. 8, but showing LOCK-OFF condition of the lock mechanism.

While, as will be seen from FIG. 9, when the cam member 16 assumes a second position wherein the first cams 32 thereof push side edges of the rounded recesses 33 of the inner pieces 20, the inner pieces 20 are separated from the inner gear 23 of the arm plate 10. Under this condition, the arm plate 10 is permitted to pivot relative to the base plate 8, that is, the seat back is permitted to pivot relative to the seat cushion. The pivotal movement of the cam member 16 between the first and second positions is induced by the pivotal movement of the rotation shaft 15.

As has been mentioned hereinabove, the outer side reclining mechanism 6 has substantially the same construction as the inner side reclining mechanism 6' except for the orientation of the parts and the following construction.

That is, in the outer side reclining mechanism 6, the control lever 11 is used in place of the above-mentioned lever 11a of the rotation shaft 15. Thus, when the control lever 11 is pivoted upward against a biasing means corresponding to the above-mentioned worm type spring 30, paired inner pieces corresponding to the above-mentioned paired inner pieces 20 are forced to disengage from an inner gear corresponding to the above-mentioned inner gear 23, and thus, an arm plate corresponding to the above-mentioned arm plate 10 is permitted to pivot relative to a base plate corresponding to the above-mentioned base plate 8.

As is seen from FIGS. 1 and 2, the connecting rod 1 extends between the inner and outer side reclining mechanisms 6' and 6 to bring about a simultaneous operation between the two mechanisms 6' and 6. As is seen from FIG. 3, the connecting rod 1 comprises an elongate pipe part 2 and an elongate plate part 3 which extends along the pipe part 2. As is understood from FIGS. 3 and 4, the pipe part 2 has at each end a splined opening 5. For the reason which will be described hereinafter, the connecting rod 1 is formed at a part thereof with a slit 4 to lower the mechanical strength of the part.

As is seen from FIG. 2, the right side splined opening 5 of the connecting rod 1 is received over the splined shaft 11b of the rotation shaft 15 of the inner side reclining mechanism 6', and the left side splined opening of the connecting rod 1 is received over the splined shaft of the rotation shaft of the outer side reclining mechanism 6, to which the control lever 11 is secured. That is, the two splined shafts are connected to the pipe part 2 through a spline connection. Thus, the rotation shaft 15 of the inner side reclining mechanism 6', the rotation shaft (15) of the outer side reclining mechanism 6 and the connecting rod 1 can rotate together like a single unit.

Figure 10:
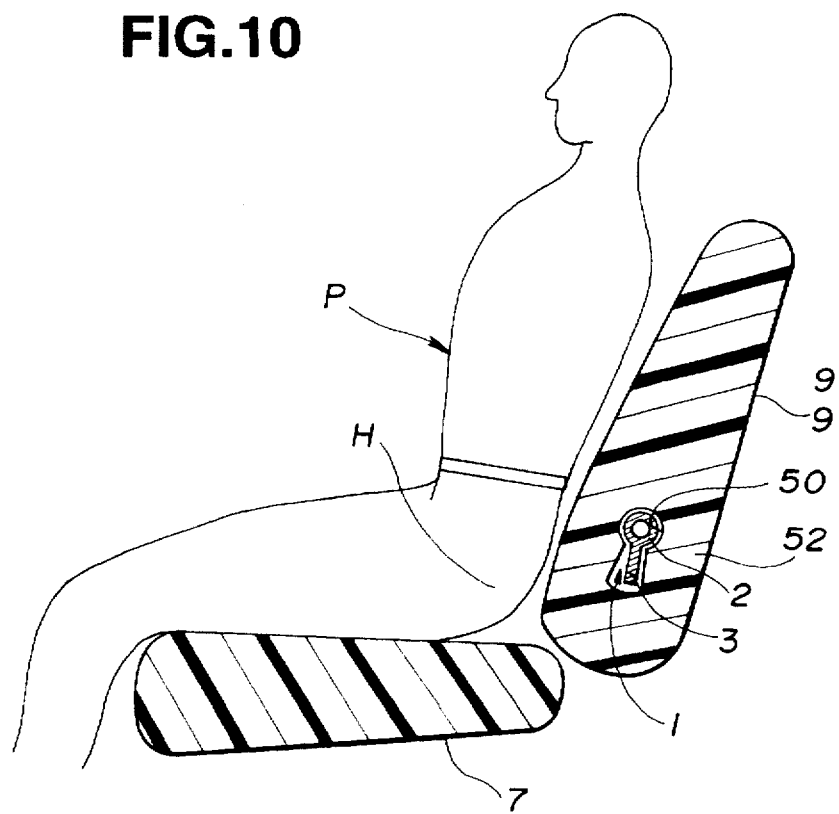
FIG. 10 is a schematic side view of an automotive seat to which the present invention is applied.

As is seen from FIG. 10, the connecting rod 1 extends across a bottom part of the seat back 9. More specifically, the connecting rod 1 extends in a laterally extending narrow tunnel 50 defined by a flexible pad 52 packed in the seat back 9.

Figure 6:
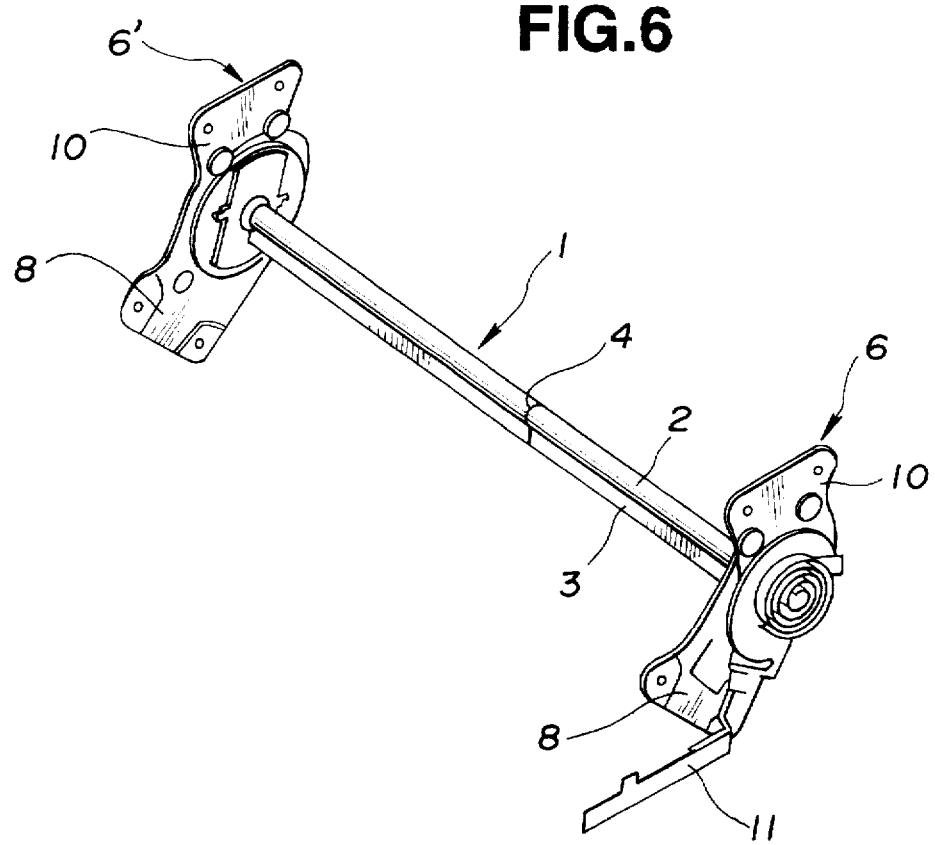
FIG. 6 is a perspective view of the seat reclining device of the present invention.

It is further to be noted that as is seen from FIGS. 6 and 10, upon assembly of the seat, the connecting rod 1 is so arranged that the elongate plate part 3 thereof extends downward from the pipe part 2 to face forward, that is, toward a hip "H" of a seat occupant "P".

In the following, normal operation of the seat reclining device of the present invention will be described with reference to the drawings.

For ease of understanding, the description will be commenced with respect to an occupant seating condition wherein as will be understood from FIG. 6 the seat back is locked to the seat cushion while assuming a certain angular position relative to the same. In this condition, the inner pieces 20 of each side reclining mechanism 6 or 6' are in meshed engagement with the inner gear 23 of the arm plate 10 as is seen from FIG. 8.

When, for the purpose of changing the angular position of the seat back, the control lever 11 is pulled upward against the force of the worm type springs 30 of the two reclining mechanisms 6 and 6', the cam member 16 of each mechanism 6 or 6' is pivoted in a clockwise direction in FIG. 8. With this operation, the paired inner pieces 20 of each mechanism 6 or 6' are moved toward each other canceling the meshed engagement between the inner pieces 20 and the inner gear 23 of the arm plate 10, as is seen from FIG. 9. Under this condition, the seat back can pivot freely relative to the seat cushion, as has been mentioned hereinabove.

When, after pivoting the seat back to a new angular position, the control lever 11 is released from an operator's hand, the control lever 11 is returned to an original rest position together with the lever 11a of the rotation shaft 15 due to the force of the worm type springs 30. This return movement induces a counterclockwise pivoting of the connecting rod 1 and thus each cam member 16 in FIG. 9, and thus the paired inner pieces 20 are brought into engagement with the internal gear 23 of the arm plate 10. Upon this, the seat back is locked to the seat cushion at the new angular position.

In the following, advantageous action of the seat reclining device of the invention expected upon application of an abnormally big force thereto due to a vehicle collision or the like will be described with reference to FIGS. 5, 6, 7, 10 and 11.

As has been mentioned hereinabove, in the occupant seating condition as shown in FIG. 10, the seat reclining device of the invention assumes the condition depicted by FIG. 6 wherein as is shown in FIG. 5, the two pairs of inner pieces 20 of the inner and outer side reclining mechanisms 6' and 6 are in meshed engagement with the internal gears 23 of the respective arm plates 10. That is, LOCK-ON condition is established by the two side reclining mechanisms 6' and 6.

When now, due to a vehicle collision or the like, an abnormally big force is applied to the seat and thus to the reclining device, some portions of the reclining device tend to be deformed inducing the possibility of undesired separation of the inner pieces 20 of the side reclining mechanisms 6 and 6' from the corresponding internal gears 23. That is, due to connection between the inner pieces 20 and the connecting rod 1, the connecting rod is strongly biased to pivot in a clockwise direction in FIGS. 1 and 11.

Figure 7:
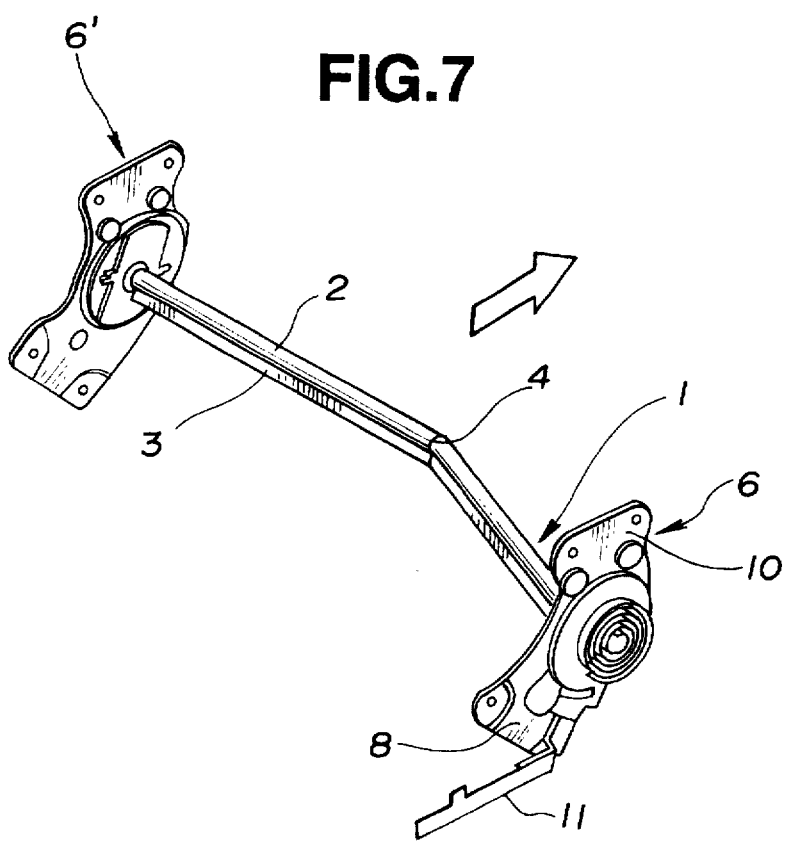
FIG. 7 is a view similar to FIG. 6, but showing a condition wherein the connecting rod is bent due to application of an abnormally big force thereto.
Figure 11:
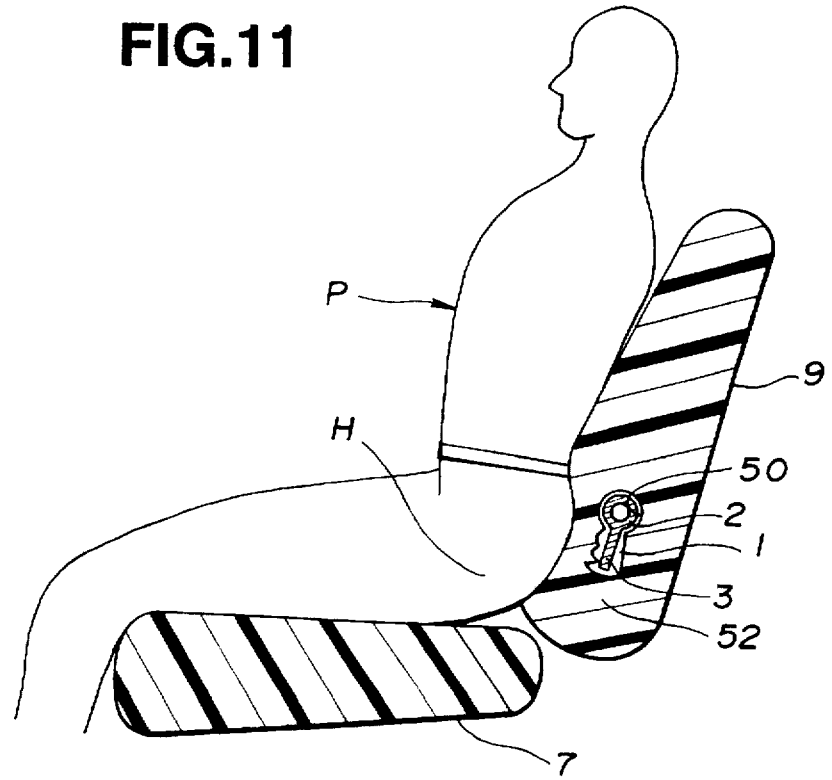
FIG. 11 is a view similar to FIG. 10, but showing a condition wherein due to a vehicle collision or the like, an abnormally big force is applied to the seat reclining device.
Figure 12:
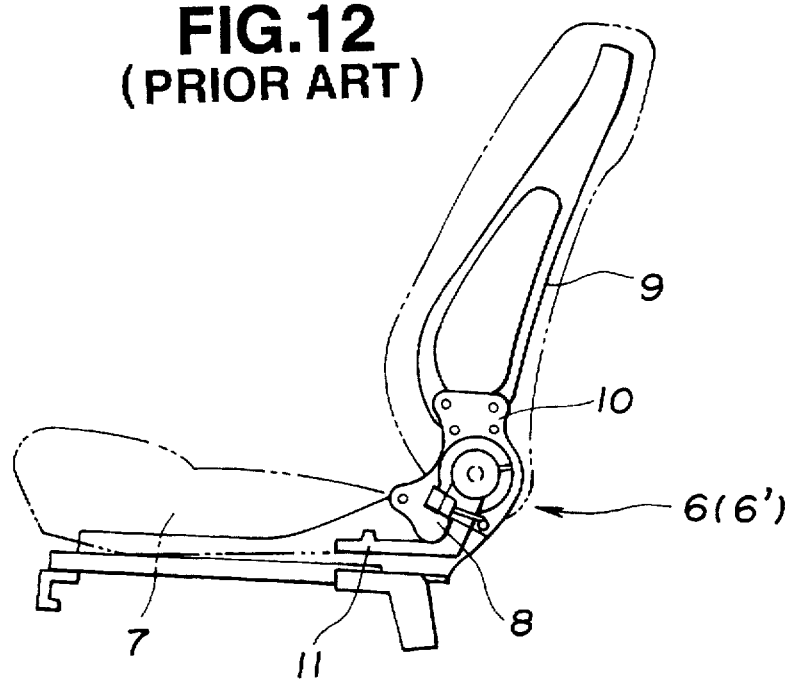
FIG. 12 is a side view of an automotive seat to which a conventional reclining device is applied.
Figure 13:
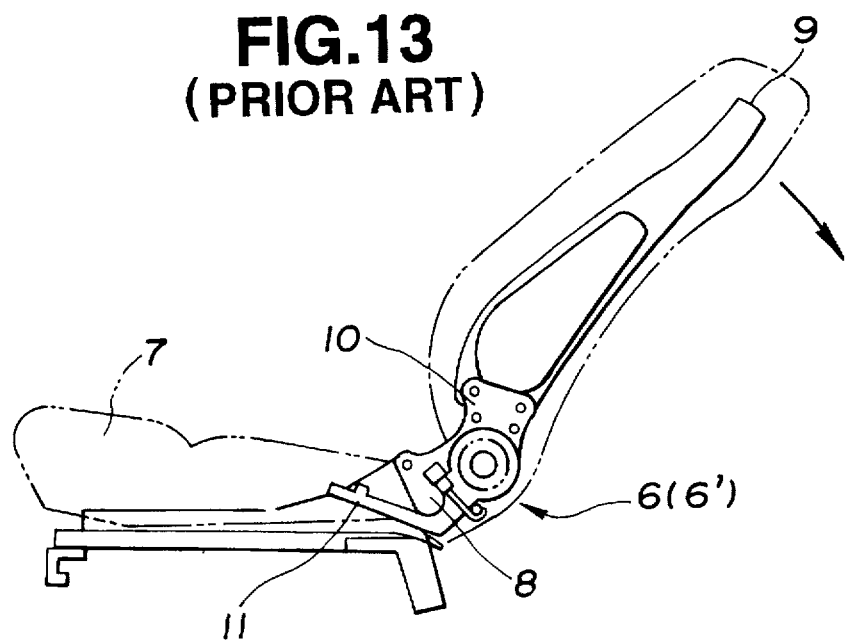
FIG. 13 is a view similar to FIG. 12, but showing a free condition of the reclining device.

However, according to the present invention, as is seen from FIG. 11, a certain deformation of the seat back pad 52 inevitably provided by the occupant's hip "H" upon such vehicle collision can present such undesired separation. That is, due to the deformation of the pad 52, the tunnel 50 of the pad 52 is reduced to such a size as to prevent the undesired clockwise pivoting of the connecting rod 1. That is, the elongate plate part 3 of the connecting rod 1 becomes in abutment with the deformed part of the tunnel 50 for prevention of such undesired pivoting of the connecting rod 1. Thus, even in a vehicle collision, the LOCK-ON condition of the reclining device is not released. That is, due to the rotation preventing function possessed by the If much greater collision force is applied to the reclining device, the connecting rod 1 is bent at the part where the slit 4 is provided, as is shown by FIG. 7. In this case, the undesired clockwise pivoting of the connecting rod 1 is assuredly prevented thereby keeping LOCK-ON condition of the reclining device.

What is claimed is:

1. A reclining device adapted for use in a seat including a seat cushion and a seat back having a flexible pad packed therein, said reclining device being adapted to pivot the seat back to a desired angular Position relative to the seat cushion, said reclining device comprising:

first and second side reclining mechanisms which are substantially the same in construction and are adapted to be mounted to respective sides of the seat to allow the seat back to be locked at the desired angular position;

a connecting rod extending between said first and second side reclining mechanisms, said connecting rod adapted to induce a locked condition of the seat back when turned in a first direction about an axis thereof and adapted to induce an unlocked condition of the seat back when turned in a second direction about the axis, said connecting rod being adapted to pass through a narrow tunnel formed in the flexible pad of the seat back;

a control lever connected to one end of said connecting rod to pivot therewith; and an elongate plate part formed on and substantially extending along an entire length of said connecting rod, said elongate part extending radially outwardly from said connecting rod.

2. A reclining device as claimed in claim 1, in which said projection is an elongate plate part formed on said connecting rod.

3. A reclining device as claimed in claim 2, in which said connecting rod comprises an elongate pipe part and said elongate plate part which extends along the elongate pipe part.

4. A reclining device as claimed in claim 3, in which said elongate pipe part has at both ends thereof splined openings into which splined shafts possessed by the two side reclining mechanisms are intimately inserted.

5. A reclining device as claimed in claim 1, in which said connecting rod is formed at a portion thereof with a slit for lowering the mechanical strength of the portion.

6. A reclining device adapted for use in a seat including a seat cushion and a seat back having a flexible pad packed therein, said reclining device adapted to pivot the seat back to a desired angular position relative to the seat cushion, said reclining device comprising:

first and second side reclining mechanisms which are substantially the same in construction and are adapted to be mounted to respective sides of the seat to allow the seat back to be locked at the desired angular position;

a connecting rod extending between said first and second side reclining mechanisms, said connecting rod adapted to induce a locked condition of the seat back when turned in a first direction about an axis thereof and adapted to induce an unlocked condition of the seat back when turned in a second direction about the axis;

a control lever connected to one end of said connecting rod to pivot therewith; and a projection formed on said connecting rod, said projection having a part which extends perpendicular to the axis of said connecting rod, wherein each of said first and second side reclining mechanisms comprises:

a base plate adapted to be secured to the seat cushion, said base plate having a guide groove;

an arm plate adapted to be secured to the seat back, said arm plate having a circular recess which defines around a periphery thereof an internal gear, said arm plate being so oriented that the circular recess faces the guide groove of said base plate;

two inner pieces slidably received in said guide groove of said base plate in a manner to leave a certain space therebetween, each inner piece having external teeth which are engaged with said internal gear when said inner piece assumes an outer position and are disengaged from said internal gear when said inner piece assumes an inner position;

a cam member rotatably received in said certain space, said cam member being connected to said connecting rod to rotate therewith, said cam member moving said inner piece to said outer and inner positions when turned in response to the turning of said connecting rod in said first and second directions respectively;

first biasing means for biasing said arm plate to turn in a given direction relative to said base plate; and second biasing means for biasing said connecting rod to turn in said first direction.

7. A reclining device as claimed in claim 6, further comprising a rotation shaft through which said arm plate and said base plate are pivotally connected, said rotation shaft having said cam member mounted thereon and having a splined end which is connected to one end of said connecting rod through a spline connection.

8. A reclining device as claimed in claim 7, in which said first biasing means comprises:

a holder member secured to said base plate, said holder member having a center pin which is aligned with the connecting rod;

a coil type return spring having an inner end hooked to said center pin and an outer end connected to said arm plate.

9. A reclining device as claimed in claim 8, in which said second biasing means comprises:

an arm secured to said holder member; and a worm type spring having one end hooked to said arm and the other end hooked to a radially extending arm of said rotation shaft.

10. An automotive reclining seat comprising:

a seat cushion;

a seat back having a flexible pad packed therein;

first and second side reclining mechanisms which are substantially the same in construction and mounted to respective sides of said seat cushion and seat back for allowing the seat back to be locked at a desired angular position relative to said seat cushion;

a connecting rod extending between said first and second side reclining mechanisms, said connecting rod inducing a locked condition of said seat back when turned in a first direction about an axis thereof and inducing an unlocked condition of said seat back when turned in a second direction about the axis;

a control lever connected to said connecting rod to pivot therewith;

means defining in the flexible pad of said seat back a narrow tunnel through which said connecting rod extends; and a projection formed on said connecting rod, said projection being brought into abutment with a wall of said narrow tunnel to suppress the turning of said connecting rod in the second direction when said narrow tunnel is largely deformed.

11. An automotive reclining seat as claimed in claim 10, in which said projection is an elongate plate part formed on said connecting rod.

12. An automotive reclining seat as claimed in claim 11, in which said connecting rod comprises an elongate pipe part and said elongate plate part which extends along the elongate pipe part.

13. An automotive reclining seat as claimed in claim 12, in which said connecting rod is formed at a portion thereof with a slit for lowering the mechanical strength of said portion.

\* \* \* \* \*